United States Patent
Morrison

(10) Patent No.: US 10,355,754 B2
(45) Date of Patent: Jul. 16, 2019

(54) MULTIPLE INPUT MULTIPLE OUTPUT DISTRIBUTED ANTENNA SYSTEM ARCHITECTURES

(71) Applicant: Andrew Wireles Systems GmbH, Buchdorf (DE)

(72) Inventor: Charles B. Morrison, Forest, VA (US)

(73) Assignee: Andrew Wireles Systems GmbH, Buchdorf (DE)

( * ) Notice: Subject to any disclaimer, the term of this patent is extended or adjusted under 35 U.S.C. 154(b) by 0 days.

(21) Appl. No.: 15/571,239

(22) PCT Filed: Apr. 29, 2016

(86) PCT No.: PCT/US2016/030208
§ 371 (c)(1),
(2) Date: Nov. 1, 2017

(87) PCT Pub. No.: WO2016/179021
PCT Pub. Date: Nov. 10, 2016

(65) Prior Publication Data
US 2018/0278299 A1  Sep. 27, 2018

Related U.S. Application Data

(60) Provisional application No. 62/155,574, filed on May 1, 2015.

(51) Int. Cl.
*H04B 7/04* (2017.01)
*H04B 7/0413* (2017.01)
(Continued)

(52) U.S. Cl.
CPC .............. *H04B 7/0413* (2013.01); *H04B 1/00* (2013.01); *H04B 1/0064* (2013.01); *H04B 1/26* (2013.01);
(Continued)

(58) Field of Classification Search
CPC ... H04B 7/0413; H04B 7/0447; H04B 7/0837
See application file for complete search history.

(56) References Cited

U.S. PATENT DOCUMENTS 7,702,049 B2 *  4/2010  Tsui ................... H04L 27/2647
375/316
8,798,103 B2 *  8/2014  Kyperountas ........ H04B 1/0064
370/334
(Continued)

FOREIGN PATENT DOCUMENTS

| EP | 2698921 A2 | 2/2014 |
|---|---|---|
| WO | 9630964 A1 | 10/1996 |
| WO | 2014203249 A1 | 12/2014 |

OTHER PUBLICATIONS

International Searching Authority, International Search Report and Written Opinion from PCT Application No. PCT/US2016/030208 dated Aug. 8, 2016, Aug. 8, 2016, pp. 1-12, WO.
(Continued)

*Primary Examiner* — Simon Nguyen
(74) *Attorney, Agent, or Firm* — Fogg & Powers LLC

(57) ABSTRACT

One embodiment is directed to a multiple input, multiple output ("MIMO") telecommunications system comprising a plurality of signal paths. The system further comprises mixers located in the plurality of signal paths, the mixers being coupled to oscillators for producing a plurality of signals occupying non-overlapping frequency bands and representative of wireless signals. The system further comprises a summer coupled to the plurality of signal paths for summing the plurality of signals to form summed signals. The system further comprises a shared analog-to-digital converter for converting the summed signals to digital signals.

22 Claims, 6 Drawing Sheets

(51) Int. Cl.
*H04W 88/08* (2009.01)
*H04B 1/00* (2006.01)
*H04B 1/26* (2006.01)
*H04B 7/06* (2006.01)
*H04L 25/02* (2006.01)
*H04L 25/03* (2006.01)

(52) U.S. Cl.
CPC .............. *H04B 7/04* (2013.01); *H04B 7/0617* (2013.01); *H04L 25/02* (2013.01); *H04L 25/03* (2013.01); *H04W 88/085* (2013.01)

(56) References Cited

U.S. PATENT DOCUMENTS

| | | | | |
|---|---|---|---|---|
| 8,884,800 | B1* | 11/2014 | Fay | H03M 1/12 341/155 |
| 2005/0141406 | A1 | 6/2005 | Maltsev et al. | |
| 2007/0082646 | A1* | 4/2007 | Behzad | H04B 1/005 455/339 |
| 2009/0296666 | A1* | 12/2009 | Rimini | H04B 1/707 370/336 |
| 2010/0091688 | A1 | 4/2010 | Staszewski et al. | |
| 2010/0261438 | A1* | 10/2010 | Walley | H04B 1/0003 455/77 |
| 2010/0265875 | A1* | 10/2010 | Zhao | H04B 1/0007 370/316 |
| 2012/0076229 | A1 | 3/2012 | Brobston et al. | |
| 2012/0329523 | A1 | 12/2012 | Stewart et al. | |
| 2013/0003714 | A1 | 1/2013 | Cannon et al. | |
| 2013/0114588 | A1 | 5/2013 | Kyperountas et al. | |
| 2013/0287077 | A1 | 10/2013 | Fernando et al. | |
| 2014/0248050 | A1 | 9/2014 | Crilly et al. | |
| 2014/0256278 | A1 | 9/2014 | Ko et al. | |
| 2014/0292579 | A1 | 10/2014 | Oh et al. | |
| 2014/0313984 | A1* | 10/2014 | Diamond | H04B 1/40 370/329 |
| 2016/0142125 | A1* | 5/2016 | Elmakias | H04B 7/0837 375/340 |
| 2016/0285617 | A1* | 9/2016 | Van der Goes | H04L 7/0331 |

OTHER PUBLICATIONS

European Patent Office, "Extended European Search Report from EP Application No. 16789849.3 dated Nov. 16, 2018", from Foreign Counterpart to U.S. Appl. No. 15/571,239, filed Nov. 16, 2018, pp. 1-11, Published: EP.

* cited by examiner

MULTIPLE INPUT MULTIPLE OUTPUT DISTRIBUTED ANTENNA SYSTEM ARCHITECTURES

CROSS-REFERENCE TO RELATED APPLICATIONS

This application is a U.S. National Stage application of PCT Application Serial No. PCT/US2016/030208, filed Apr. 29, 2016, and titled "MULTIPLE INPUT MULTIPLE OUTPUT DISTRIBUTED ANTENNA SYSTEM ARCHITECTURES," which claims the benefit of U.S. Provisional Patent Application Ser. No. 62/155,574, filed May 1, 2015, all of which are hereby incorporated herein by reference.

BACKGROUND

The present disclosure relates to architectures for multiple input, multiple output ("MIMO") distributed antenna systems, and more particularly, to the use of high dynamic range analog-to-digital converters and digital-to-analog converters in distributed antenna system architectures.

SUMMARY

One embodiment is directed to a multiple input, multiple output telecommunications system comprising a plurality of signal paths. The system further comprises mixers located in the plurality of signal paths, the mixers being coupled to oscillators for producing a plurality of signals occupying non-overlapping frequency bands and representative of wireless signals. The system further comprises a summer coupled to the plurality of signal paths for summing the plurality of signals to form summed signals. The system further comprises a shared analog-to-digital converter for converting the summed signals to digital signals.

DRAWINGS

DETAILED DESCRIPTION

Architectures for a digital distributed antenna system ("DAS") with MIMO may use dedicated paths for each signal to and from antennas at a remote unit and antenna ports at a base station. Very high dynamic range analog-to-digital ("A/D") and digital-to-analog ("D/A") converters may be used to allow for alternative and improved architectures for DAS systems.

A remote unit in a MIMO system may include multiple signal paths (e.g., two input signal paths and two output signal paths). The signal paths may include mixers coupled to oscillators. The mixers and oscillators may process wireless signals received in the signal path so the frequency bands of the wireless signals do not overlap. The non-overlapping signals may be applied to a summer coupled to the signal paths to combine, or sum, the non-overlapping signals from the multiple signal paths. In an uplink direction, a very high dynamic range A/D converter may be used to digitize the combined signals. In a downlink direction, a very high dynamic range D/A converter may be used to recreate analog signals from the combined signals. The A/D and D/A converters may have sample rates or analog bandwidths sufficient to digitize or recreate analog signals containing multiple signal channels.

Figure 1:
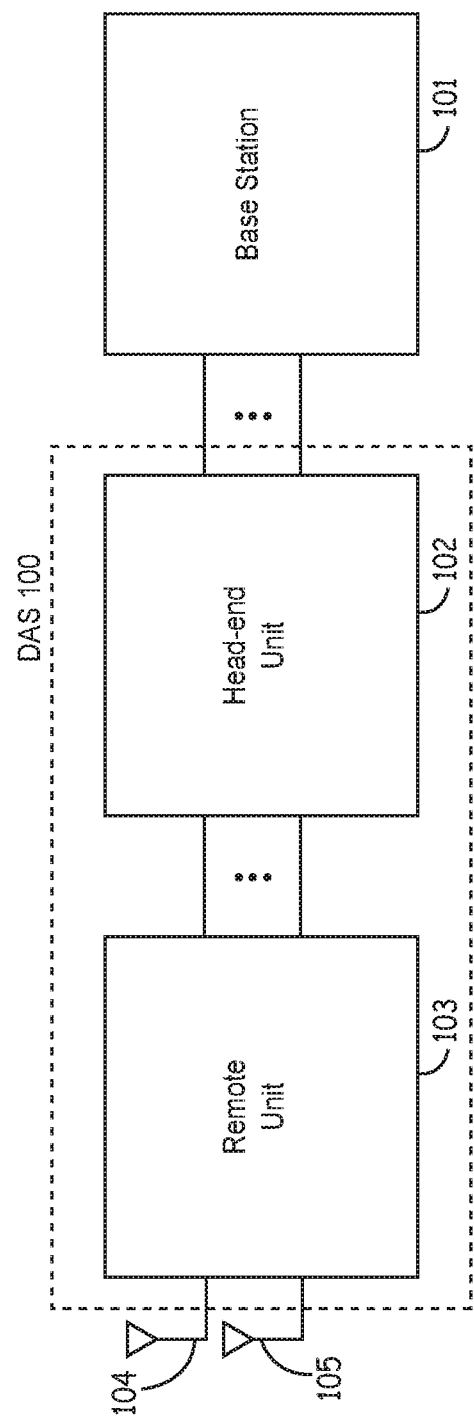
FIG. 1 is a block diagram of an example telecommunications system according to one embodiment described in the present disclosure.

FIG. 1 shows an example of a telecommunications system that may be used for implementing an aspect of the present disclosure.

The telecommunications system may include a DAS 100 having multiple input and multiple output channels (e.g., a MIMO DAS). A base station 101 may be communicatively coupled to DAS 100 via a head-end unit 102 in DAS 100. DAS 100 includes remote unit 103 communicatively coupled to head-end unit 102. Remote unit may include a receive antenna port 104 and a transmit antenna port 105. In some aspects, receive antenna port 104 may represent multiple receive antennas and transmit antenna port 105 may represent multiple transmit antennas. For illustrative purposes, one head-end unit and one remote unit are depicted in FIG. 1. But, any number of head-end units and remote units may be included in DAS 100.

In some aspects, head-end unit 102 may be a master unit or other suitable unit that may communicate with one or more base stations or other transceiver devices in communication with DAS 100. Head-end unit 102 may include, for example, an optical transceiver that transmits optical signals to remote unit 103. Head-end unit 102 or other suitable unit may communicate with remote units in different coverage zones of DAS 100.

DAS 100 may communicate signals to and from mobile stations or other terminal devices via head-end unit 102 and remote unit 103 that services one or more coverage zones. Head-end unit 102 may be communicatively coupled with base station 101 and remote unit 103 in any suitable manner. Communicatively coupling devices in DAS 100 or another telecommunication system may involve establishing, maintaining, or otherwise using a communication link (e.g., a cable, an optical fiber, a wireless link, etc.) to communicate information between the devices. Any suitable types of communication links may be used. A suitable communication link may be a wired connection or a wireless connection. Types of wired connections may include, for example, a connection via a copper cable, an optical fiber, or another suitable communication medium. The type of communication link between base station 101 and head-end unit 102 may be the same as or different from the type of communication link between head-end unit 102 and remote unit 103.

Head-end 102 unit may provide downlink signals from base station 101 to remote unit 103 and receive uplink signals from remote unit 103 to be provided to base station 101. Downlink signals may include signals provided from base station 101 and transmitted by remote unit 103 to coverage zones. Uplink signals may include signals transmitted by mobile stations or other terminal devices and received by remote unit 103. The downlink and uplink signals may include MIMO signals.

Remote unit 103 may provide signal coverage in one or more coverage zones. Providing signal coverage in the coverage zones may include wirelessly transmitting downlink signals received from head-end unit 102 to mobile stations or other terminal devices in the coverage zones. Providing signal coverage in the coverage zones may also include wirelessly receiving uplink signals from the mobile communication devices or other mobile stations or other terminal devices in the coverage zones. Remote unit 103 may transmit the uplink signals to head-end unit 102. Head-end unit 102 may transmit the uplink signals to base station 101.

Although FIG. 1 depicts direct links between head-end unit 102 and remote unit 103, other implementations may be possible. In some aspects, head-end unit 102 may be communicatively coupled to remote unit 103 via one or more extension units or other intermediate devices.

Figure 2:
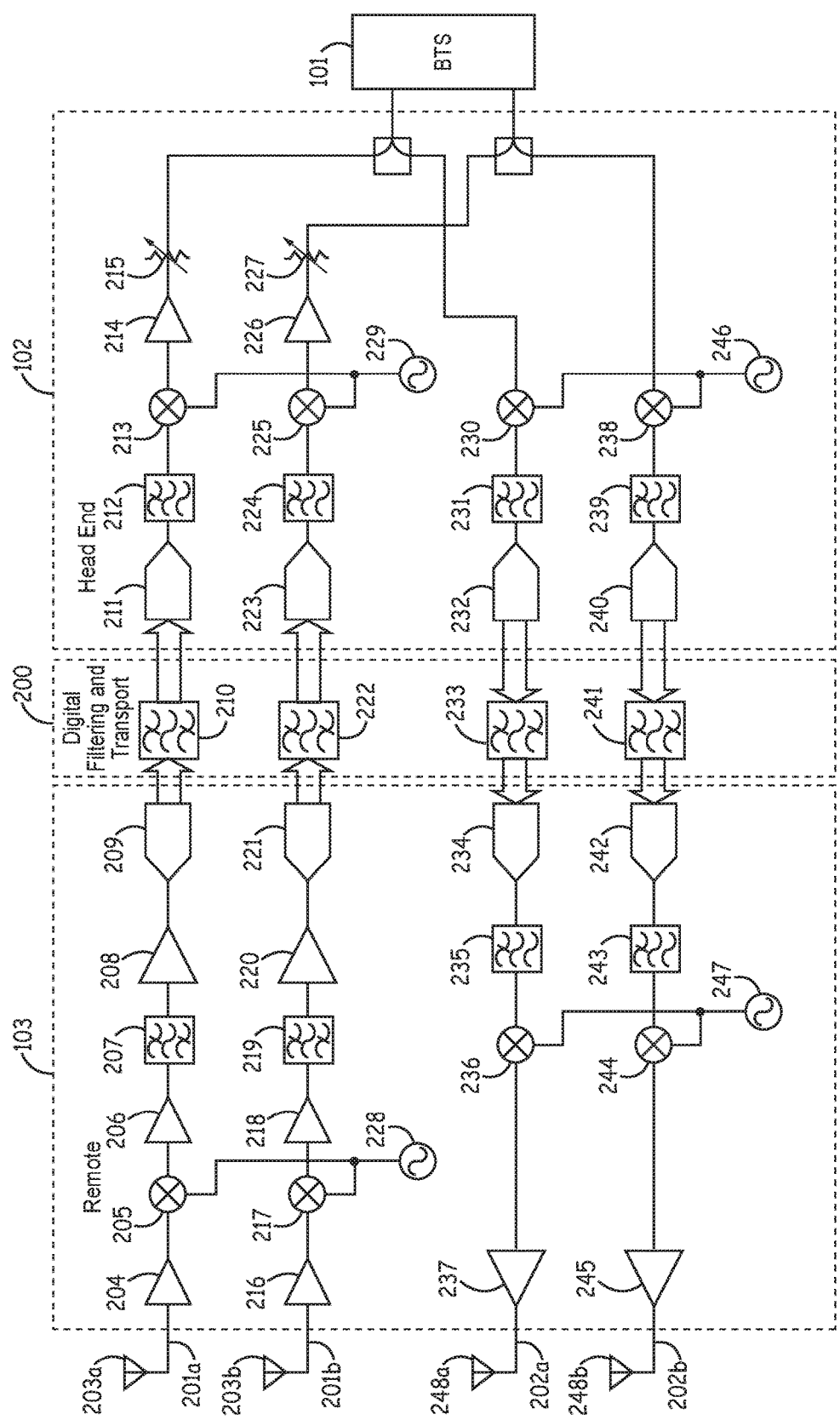
FIG. 2 is a schematic of an example conventional architecture for a distributed antenna system.

FIG. 2 shows a schematic of an example conventional architecture for DAS 100 in FIG. 1 having two input channels and two output channels (2×2), according to one aspect. Base station 101 includes multiple antenna ports communicatively coupled to DAS 100 via head-end unit 102. Head-end unit 102 is communicatively coupled to remote unit 103 via a digital filtering and transport ("DFT") unit 200 containing filtering components. The architecture includes a dedicated signal path for each channel using separate A/D and D/A converters. DAS 100 includes four channels with two uplink paths 201a, 201b and two downlink paths 202a, 202b. Although a 2×2 MIMO DAS architecture is shown, the architecture may support additional channels without departing from the scope of the present disclosure (e.g., 4×4, etc.).

In the uplink direction, uplink paths 201a, 201b are coupled to antennas 203a, 203b, respectively. In remote unit 103, uplink path 201a includes low-noise amplifier 204, mixer 205, amplifier 206, anti-aliasing filter 207, amplifier 208, and A/D converter 209. Remote unit is communicatively coupled to DFT unit 200 that includes a digital intermediate frequency ("IF") filter 210 in uplink path 201a. DFT unit 200 is communicatively coupled to head-end unit 102 that includes D/A converter 211, analog filter 212, mixer 213, amplifier 214, and variable attenuator 215. Head-end unit is communicatively coupled to base station 101. Uplink path 201b similarly includes low-noise amplifier 216, mixer 217, amplifier 218, anti-aliasing filter 219, amplifier 220, and A/D converter 220 in remote unit 103, communicatively coupled to digital IF filter 222 in DFT unit 200. In head-end unit 102, uplink path 201b includes D/A converter 223, analog filter 224, mixer 225, amplifier 226, and variable attenuator 227. Mixer 205 in uplink path 201a and mixer 217 in uplink path 201b are coupled to oscillator 228. Mixer 213 in uplink path 201a and mixer 225 in uplink path 201b are coupled to oscillator 229.

In the downlink direction, downlink path 202a includes mixer 230, anti-aliasing filter 231, and A/D converter 232 in head-end unit 102 coupled to digital IF filter 233 in DFT unit 200. Downlink path 202a includes D/A converter 234, analog filter 235, mixer 236, and power amplifier 237 in remote unit 103. Downlink path 202b includes mixer 238, anti-aliasing filter 239, and A/D converter 240 in head-end unit 102 coupled to digital IF filter 241 in DFT unit 200. Downlink path 202b includes D/A converter 242, analog filter 243, mixer 244, and power amplifier 245 in remote unit 103. Mixer 230 in downlink path 202a and mixer 238 in downlink path 202b are coupled to oscillator 246. Mixer 236 in downlink path 202a and mixer 244 are coupled to oscillator 247. Signals in downlink paths 202a, 202b are transmitted by remote unit 103 via antennas 248a, 248b, respectively.

Each path (uplink paths 201a, 201b and downlink paths 202a, 202b) includes separate A/D and D/A converters for converting the signals in each path because the A/D converters and D/A converters do not have sufficient bandwidths for more than one path.

Figure 3:
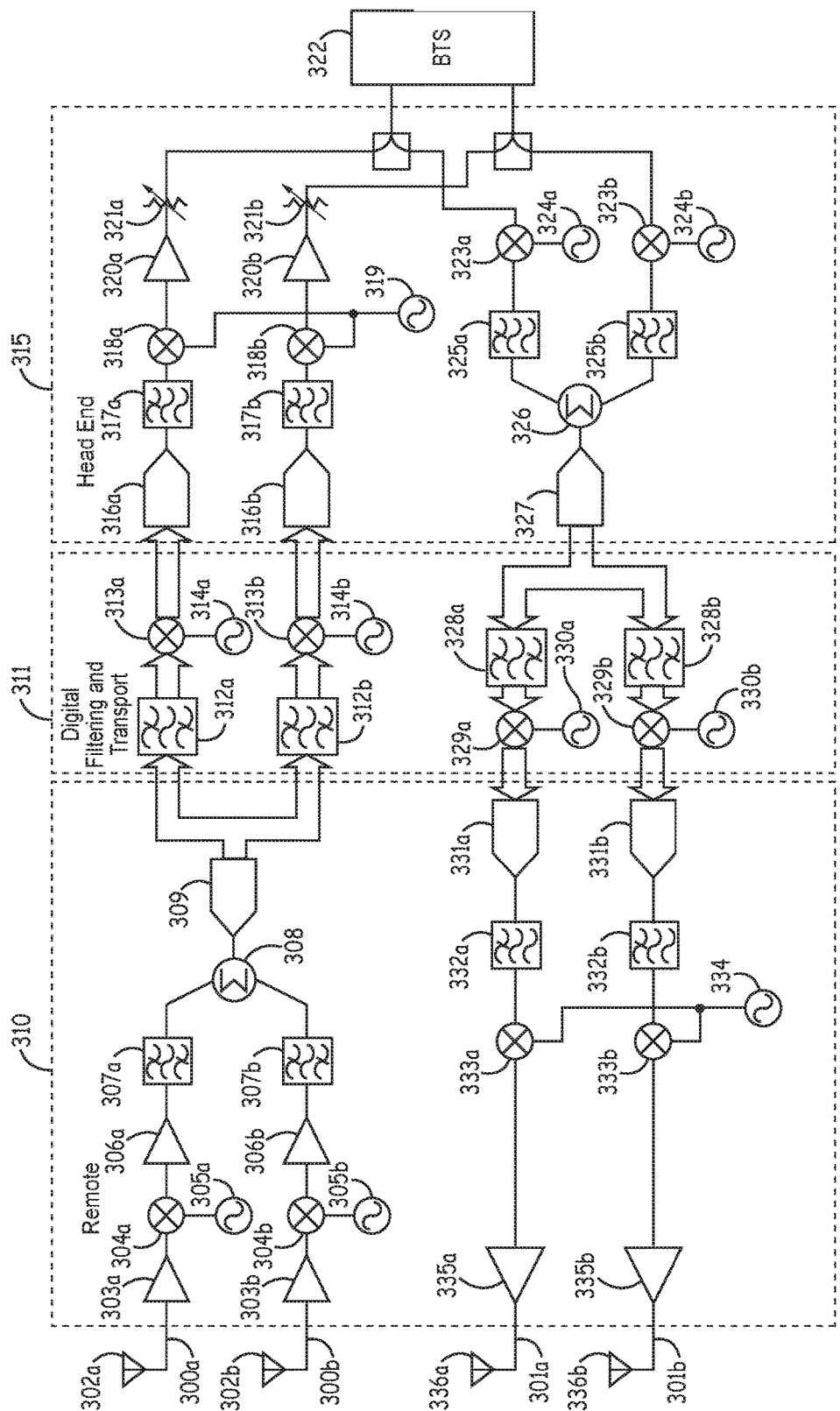
FIG. 3 is a schematic of an example of an alternative architecture to the conventional architecture for a distributed antenna system according to one embodiment described in the present disclosure.

FIG. 3 shows a schematic of an example of an alternative architecture to the conventional architecture shown in FIG. 2 using shared wideband A/D converters, according to one aspect. The architecture includes two uplink paths 300a, 300b and two downlink paths 301a, 301b. The uplink paths 300a, 300b are coupled to antennas 302a, 302b, respectively for receiving uplink signals. The uplink paths 300a, 300b include, respectively, low-noise amplifiers 303a, 303b, mixers 304a, 304b coupled to oscillators 305a, 305b, respectively, amplifiers 306a, 306b, anti-aliasing filters 307a, 307b, summer 308, and shared wideband A/D converter 309 in remote unit 310. Uplink signals in each of the uplink paths 300a, 300b may be mixed using mixers 304a, 304b and oscillators 305a, 305b such that the signals outputted from the mixers 304a, 304b occupy non-overlapping frequency bands. Mixing the signals such that they occupy non-overlapping frequency bands may result in orthogonality between signals, thus allowing the signals to be separable following being combined by summer 308. The signals may be summed using summer 308 and applied to shared wideband A/D converter 309 to digitize the output signals. In DFT unit 311, the digitized output signals are separately filtered by digital IF filters 311a, 311b that may limit the bandwidth of the output signals. The signals may be translated back to appropriate overlapping intermediate frequencies using mixers 313a, 313b, coupled to digital numerically controlled oscillators 314a, 314b, respectively. In head-end unit 316, the signals may be applied to D/A converters 316a, 316b. Uplink paths 300a, 300b include, respectively, analog filters 317a, 317b, mixers 318a, 318b coupled to oscillator 319, amplifiers 320a, 320b, and variable attenuators 321a, 321b to translate the signals to the appropriate RF for transmission to base station 322.

Downlink signals in downlink paths 301a, 301b may experience similar processing as they are transmitted from base station 322 to remote unit 310 via head-end unit 315 and DFT unit 311. In head-end unit 315, the downlink signals are travel though mixers 323a, 323b, coupled to oscillators 324a, 324b, respectively, anti-aliasing filters 325a, 325b, summer 326, and shared wideband A/D converter 327. Similar to the uplink signals in remote unit 310, the downlink signals in head-end unit 315 may be mixed using mixers 323a, 323b and oscillators 324a, 324b such that the outputted downlink signals occupy non-overlapping frequency bands. The downlink signals may be filtered and digitized by shared wideband A/D converter 327. The digitized downlink signals may be separated and filtered by digital IF filters 328a, 328b that may limit the bandwidth of the digitized downlink signals. The downlink signals may be translated back to appropriate overlapping intermediate frequencies by mixers 329a, 329b coupled to digital numerically controlled oscillators 330a, 330b, respectively, in DFT unit 311. In remote unit 310, downlink paths 301a, 301b include separate D/A converters 331a, 331b, analog filters 332a, 332b, mixers 333a, 333b, coupled to oscillator 334, and power amplifiers 335a, 335b. Downlink signals in downlink paths 301a, 301b are transmitted by remote unit 310 via antennas 336a, 336b, respectively.

Figure 4:
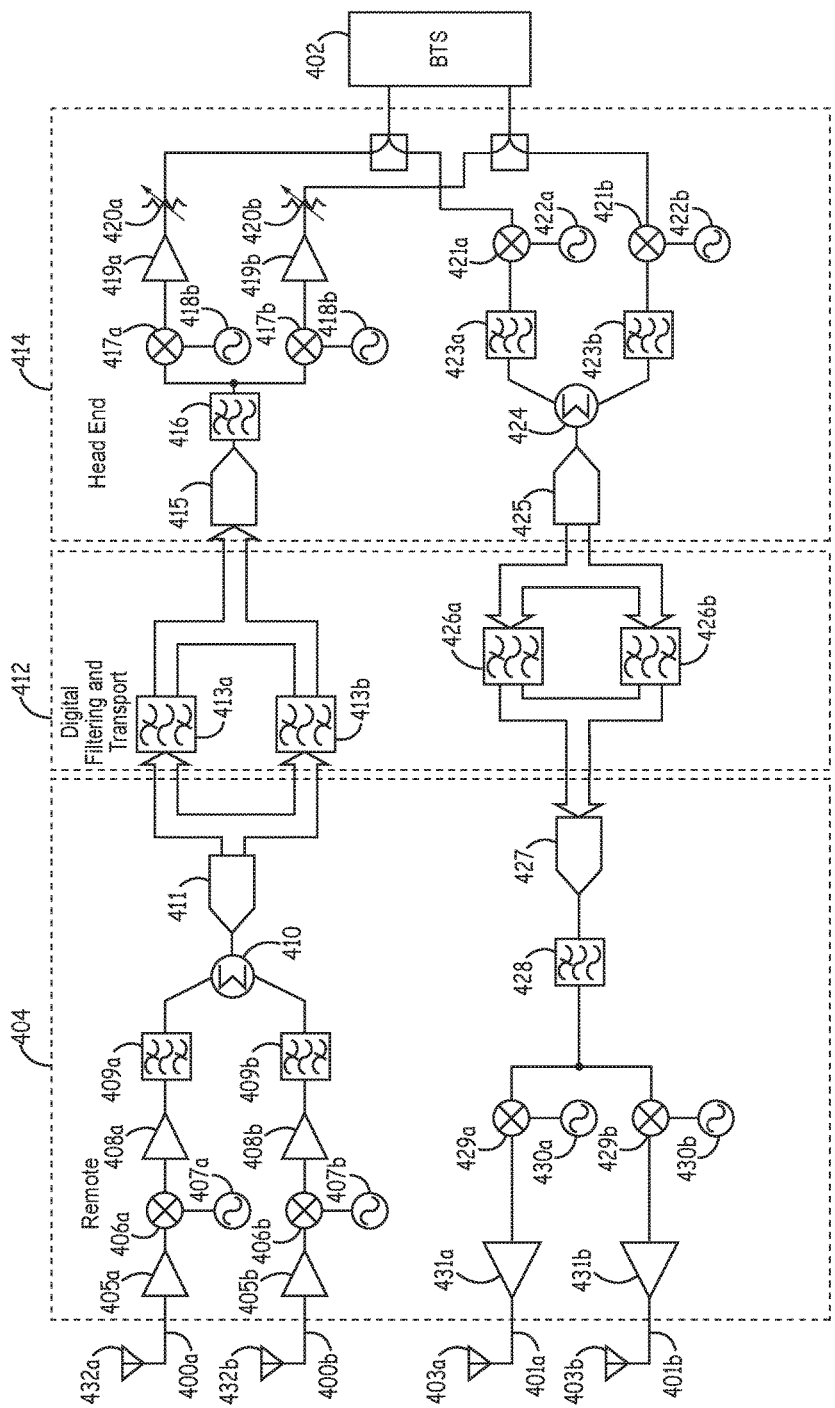
FIG. 4 is a schematic of another example of an alternate architecture to the conventional architecture for a distributed antenna system according to one embodiment described in the present disclosure.

FIG. 4 shows a schematic of another example of an alternate architecture to the conventional architecture shown in FIG. 2 using shared wideband A/D converters and shared wideband D/A converters, according to one aspect. Signals in uplink paths 400a, 400b or downlink paths 401a, 401b may be translated to non-overlapping frequency bands and digitized as in FIG. 3. But, instead of digitally translating them back to overlapping intermediate frequencies as in FIG. 3, the non-overlapping signals may be applied to a shared wideband D/A converter. The non-overlapping signals outputted from the shared wideband D/A converter may be translated back to the common RF frequency and applied to the separate ports at base station 402 (for uplink signals in uplink paths 400a, 400b) or antennas 403a, 403b (for downlink signals in downlink paths 401a, 401b, respectively) at remote unit 404.

In the uplink direction, uplink paths 400a, 400b are coupled to antennas 432a, 432b, respectively. In the uplink direction, uplink paths 400a, 400b include, respectively, low-noise amplifiers 405a, 405b, mixers 406a, 406b, coupled to oscillators 407a, 407b, respectively, amplifiers 408a, 408b, anti-aliasing filters 409a, 409b, summer 410, and shared wideband A/D converter 411 in remote unit 404. Remote unit 404 is coupled to DFT unit 412 that includes digital IF filters 413a, 413b. DFT unit 412 is coupled to head-end unit 414 that includes shared wideband D/A converter 415, analog filter 416, mixers 417a, 417b, coupled to oscillators 418a, 418b, respectively, amplifiers 419a, 419b, and variable attenuators 420a, 420b.

In the downlink direction, head-end unit 414 includes mixers 421a, 421b, coupled to oscillators 422a, 422b, respectively, anti-aliasing filters 423a, 423b, summer 424, and shared wideband A/D converter 425. Head-end unit 414 is coupled to DFT unit 412 that includes digital IF filters 426a, 426b. DFT unit 412 is coupled to remote unit 404. Downlink paths 401a, 401b include shared wideband D/A converter 427, analog filter 428, and, respectively, mixers 429a, 429b, coupled to oscillators 430a, 430b, respectively, and amplifiers 431a, 431b.

Figure 5:
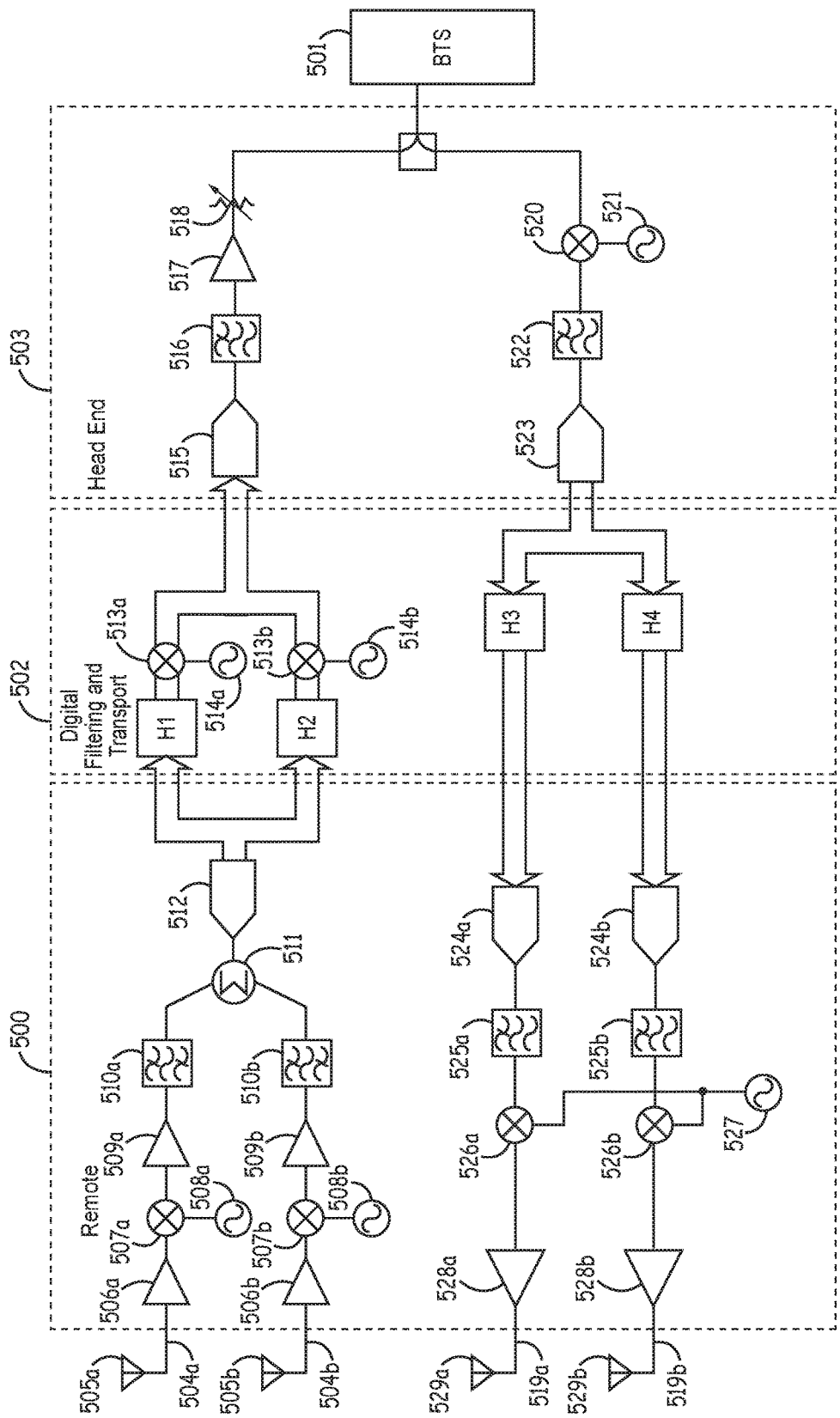
FIG. 5 is a schematic of an example architecture for a MIMO DAS coupled to a SISO base station according to one embodiment described in the present disclosure.

In some aspects, a MIMO DAS may be coupled to a single input single output ("SISO") base station. FIG. 5 shows a schematic of an example architecture for a MIMO DAS coupled to a SISO base station and using wideband A/D converters and D/A converters. The architecture includes remote unit 500 coupled to SISO base station 501 via DFT unit 502 and head-end unit 503. In the uplink direction, uplink signals in uplink paths 504a, 504b may be received from antennas 505a, 505b, respectively, translated to non-overlapping frequencies, and digitized as in FIG. 3. In remote unit 500, uplink paths 504a, 504b include, respectively, low noise amplifiers 506a, 506b, mixers 507a, 507b, coupled to oscillators 508a, 508b, respectively, amplifiers 509a, 509b, anti-aliasing filters 510a, 510b, summer 511, and shared wideband A/D converter 512. The uplink signals in remote unit 500 may be translated to non-overlapping frequency bands using mixers 507a, 507b and oscillators 508a, 508b, digitized by shared wideband A/D converter 512 and transmitted to DFT unit 502.

In DFT unit 502, the non-overlapping uplink signals may be separately applied to variable digital filters H1, H2 and translated to overlapping RF or intermediate frequencies using mixers 513a, 513b, coupled to digital numerically controlled oscillators 514a, 514b, respectively. Variable digital filters H1, H2 may be adjusted to steer the antenna pattern of antennas 505a, 505b. In head-end unit 503, the uplink signals may be converted to analog using shared wideband D/A converter 515, translated back to RF, and transmitted to the signal port at base station 501. In head-end unit 503, the uplink signals may be applied to shared wideband D/A converter 515, analog filter 516, amplifier 517, and variable attenuator 518.

Similarly, in the downlink direction, downlink signal from base station 501 may be digitized and split into downlink paths 519a, 519b. Head-end unit 503 may include a mixer 520 coupled to an oscillator 521, an anti-aliasing filter 522, and shared wideband A/D converter 523 for translating the downlink signals to non-overlapping frequency bands and digitizing the non-overlapping downlink signals. The downlink signals may be transmitted to DFT unit 502 for filtering by variable digital filters H3, H4. The downlink signals may be transmitted from DFT unit 502 to remote unit 500. In remote unit 500, the downlink signals may be applied to separate D/A converters 524a, 524b, separately translated back to RF using analog filters 525a, 525b, mixers 526a, 526b, coupled to oscillator 527, and power amplifiers 528a, 528b for transmission by remote unit 500 via antennas 529a, 529b. Similar to variable digital filters H1, H2, variable digital filters H3, H4 may be adjusted to steer the antenna pattern of antennas 529a, 529b.

Figure 6:
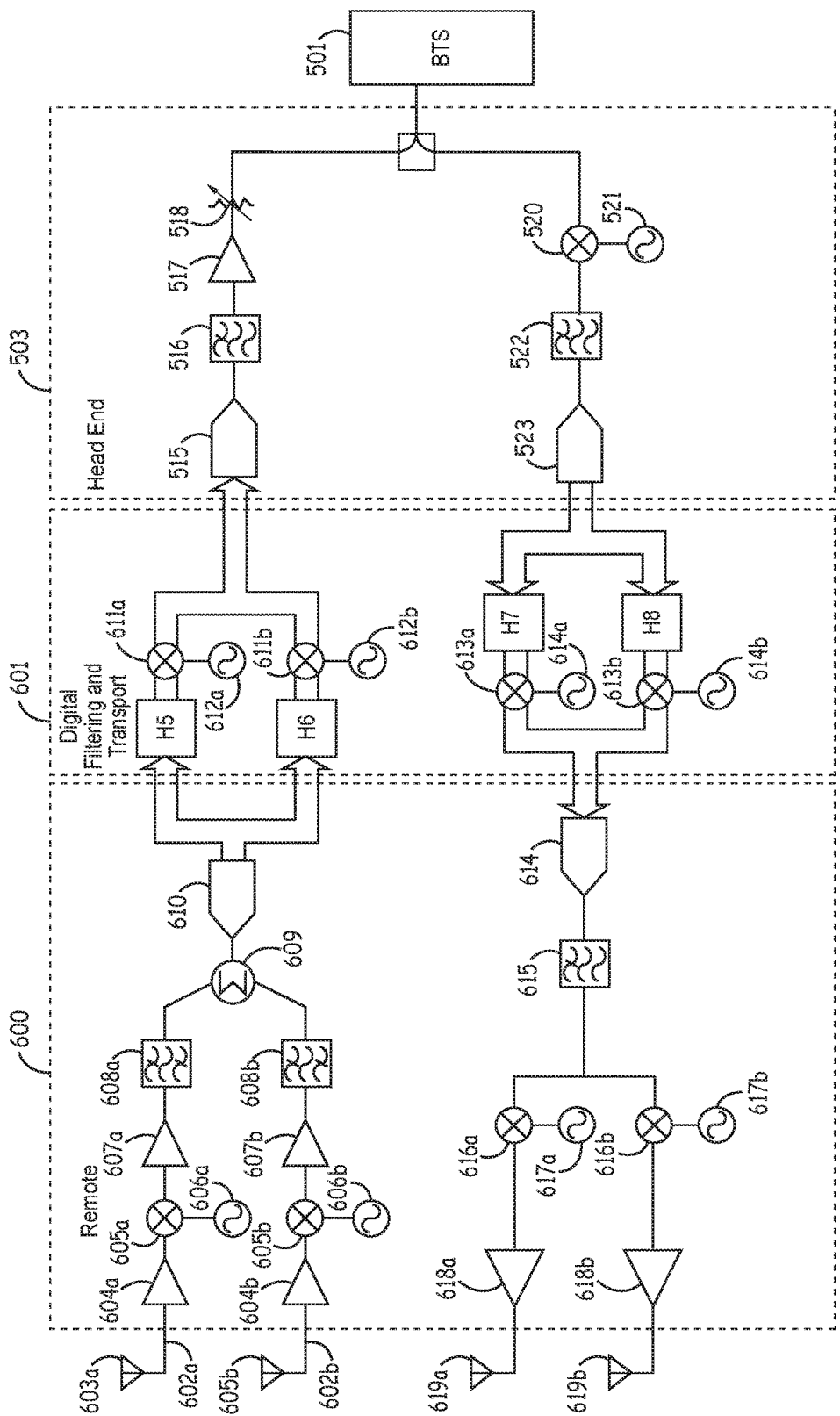
FIG. 6 is a schematic of an example alternate architecture for a MIMO DAS coupled to a SISO base station according to one embodiment described in the present disclosure.

FIG. 6 shows a schematic of an example alternate of the architecture shown in FIG. 5 using a shared wideband D/A converter in the downlink direction. Head-end unit 503 may be coupled to remote unit 600 via DFT unit 601. In the uplink direction, remote unit 600 and DFT 601 include the same architecture as remote unit 500 and DFT 502 in FIG. 5. Specifically, remote unit 600 includes uplink paths 602a, 602b coupled to antennas 603a, 603b, respectively. The uplink paths 602a, 602b in remote unit 600 include low-noise amplifiers 604a, 604b, mixers 605a, 605b, coupled to oscillators 606a, 606b, respectively, amplifiers 607a, 607b, anti-aliasing filters 608a, 608b, summer 609, and wideband A/D converter 610. DFT unit 601 includes variable digital filters H5, H6 and mixers 611a, 611b, coupled to digital numerically controlled oscillators 612a, 612b, respectively.

In DFT 601, downlink digital signals from head-end unit 503 may be separately filtered by variable digital filters H7, H8 and translated to non-overlapping frequency bands using mixers 613a, 613b, coupled to numerically controlled oscillators 614a, 614b. The signals may be transmitted to remote unit 600. The downlink signals may be applied to shared wideband D/A converter 614 and analog filter 615 in remote unit 600. The non-overlapping analog outputs from analog filter 615 may be translated to an appropriate RF frequency using analog mixers 616a, 616b, coupled to oscillators 617a, 617b, respectively, amplified by power amplifier 618, and transmitted by remote unit 600 via antennas 619a, 619b.

Although FIGS. 5 and 6 show a single signal port of a SISO base station, the present disclosure may be implemented with multiple ports of a MIMO base station. It may be possible to attain throughput gains realizable with a MIMO base station implementation as well as antenna beam steering of a DAS remote unit, depending on installation of the DAS.

Example Embodiments

Example 1 includes a multiple input and multiple output telecommunications system, comprising: a plurality of signal paths; mixers located in the plurality of signal paths, the mixers being coupled to oscillators for producing a plurality of signals occupying non-overlapping frequency bands and representative of wireless signals; a summer coupled to the plurality of signal paths for summing the plurality of signals to form summed signals; and a shared analog-to-digital converter for converting the summed signals to digital signals.

Example 2 includes the multiple input and multiple output telecommunications system of Example 1, wherein the shared analog-to-digital converter is shared among the plurality of signal paths for converting the plurality of signals to a plurality of digital signals.

Example 3 includes the multiple input and multiple output telecommunications system of any of Examples 1-2, wherein the oscillators include variable frequencies for producing the plurality of signals as orthogonal to each other.

Example 4 includes the multiple input and multiple output telecommunications system of any of Examples 1-3, further comprising: a shared digital-to-analog converter for converting the digital signals to analog signals.

Example 5 includes the multiple input and multiple output telecommunications system of any of Examples 1-4, further comprising: digital intermediate frequency filters coupled to the shared analog-to-digital converter for limiting bandwidth of the digital signals.

Example 6 includes the multiple input and multiple output telecommunications system of any of Examples 1-5, further comprising variable digital filters coupled to the shared analog-to-digital converter for steering a remote unit antenna pattern.

Example 7 includes the multiple input and multiple output telecommunications system of any of Examples 1-6, wherein the system is a distributed antenna system.

Example 8 includes the multiple input and multiple output telecommunications system of Example 7, wherein the mixers, the oscillators, the summer, and the shared analog-to-digital converter are in an uplink signal path of the distributed antenna system.

Example 9 includes the multiple input and multiple output telecommunications system of any of Examples 7-8, wherein the mixers, the oscillators, the summer, and the shared analog-to-digital converter are in a downlink signal path of the distributed antenna system.

Example 10 includes a method performed in a multiple input and multiple output telecommunications system, the method comprising: frequency shifting, using mixers coupled to oscillators, signals received in a plurality of signal paths to produce a plurality of signals occupying non-overlapping frequency bands and representative of wireless signals; summing the plurality of signals to form summed signals using a summer; and converting the summed signals to digital signals using a wideband analog-to-digital converter.

Example 11 includes the method of Example 10, wherein the wideband analog-to-digital converter is shared among the plurality of signal paths, the method further comprising converting the plurality of signals to a plurality of digital signals.

Example 12 includes the method of any of Examples 10-11, wherein the oscillators include variable frequencies for producing the plurality of signals as orthogonal to each other.

Example 13 includes the method of any of Examples 10-12, further comprising converting the digital signals to analog signals using a wideband digital-to-analog converter.

Example 14 includes the method of any of Examples 10-13, further comprising limiting bandwidth of the digital signals using digital intermediate frequency filters coupled to the wideband analog-to-digital converter.

Example 15 includes the method of any of Examples 10-14, further comprising steering a remote unit antenna pattern using variable digital filters coupled to the wideband analog-to-digital converter.

Example 16 includes the method of any of Examples 10-15, wherein the system is a distributed antenna system.

Example 17 includes the method of Example 16, wherein the mixers, the oscillators, the summer, and the wideband analog-to-digital converter are in an uplink signal path of the distributed antenna system.

Example 18 includes the method of any of Examples 16-17, wherein the mixers, the oscillators, the summer, and the wideband analog-to-digital converter are in a downlink signal path of the distributed antenna system.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:

1. A multiple input and multiple output telecommunications system, comprising:
    a head-end unit coupled to a base station; and
    a remote antenna unit communicatively coupled to the head-end unit and located remotely from the head-end unit, wherein the remote antenna unit comprises:
        a plurality of uplink signal paths;
        a first plurality of mixers located in the plurality of uplink signal paths, the first plurality of mixers being coupled to first oscillators and configured to produce a plurality of uplink signals occupying non-overlapping frequency bands and representative of wireless signals;
        a first summer coupled to the plurality of uplink signal paths and configured to sum the plurality of uplink signals to form summed uplink signals; and
        a first shared analog-to-digital converter configured to convert the summed uplink signals to digital uplink signals;
    wherein the head-end unit is configured to provide uplink signals based on the digital uplink signals to one or more signal ports of the base station.

2. The multiple input and multiple output telecommunications system of claim 1, wherein the shared analog-to-digital converter is shared among the plurality of uplink signal paths and configured to convert the plurality of uplink signals to a plurality of digital uplink signals.

3. The multiple input and multiple output telecommunications system of claim 1, wherein the oscillators include variable frequencies configured to produce the plurality of uplink signals as orthogonal to each other.

4. The multiple input and multiple output telecommunications system of claim 1, further comprising:
    digital intermediate frequency filters coupled to the first shared analog-to-digital converter and configured to limit bandwidth of the digital uplink signals.

5. The multiple input and multiple output telecommunications system of claim 1, further comprising variable digital filters coupled to the first shared analog-to-digital converter and configured to steer an antenna pattern of the remote antenna unit.

6. The multiple input and multiple output telecommunications system of claim 1, wherein the head-end unit further comprises one or more digital-to-analog converters configured to convert the digital uplink signals to analog uplink signals, wherein the head-end unit is configured to provide uplink radio frequency signals to the one or more signal ports of the base station.

7. The multiple input and multiple output telecommunications system of claim 6, wherein the head-end unit comprises:
a first shared digital-to-analog converter configured to convert the digital uplink signals to analog uplink signals;
a plurality of second mixers coupled to second oscillators and configured to produce a plurality of uplink radio frequency signals from the analog uplink signals, wherein each second mixer of the plurality of second mixers is coupled to the first shared digital-to-analog converter, wherein an output of each second mixer of the plurality of second mixers is communicatively coupled to a respective signal port of the base station.

8. The multiple input and multiple output telecommunications system of claim 6, wherein the head-end unit comprises:
a first shared digital-to-analog converter configured to convert the digital uplink signals to analog uplink signals;
wherein the head-end unit is configured to translate the analog uplink signals to uplink radio frequency signals and provide the uplink radio frequency signals to a single signal port of the base station.

9. The multiple input and multiple output telecommunications system of claim 1,
wherein head-end unit further comprises:
a plurality of downlink signal paths;
a second plurality of mixers located in the plurality of downlink signal paths, the second plurality of mixers being coupled to second oscillators and configured to produce a plurality of downlink signals occupying non-overlapping frequency bands and representative of wireless signals;
a second summer coupled to the plurality of downlink signal paths and configured to sum the plurality of downlink signals to form summed downlink signals; and
a second shared analog-to-digital converter configured to convert the summed downlink signals to digital downlink signals;
wherein the remote antenna unit further comprises one or more digital-to-analog converters configured to convert the digital downlink signals to analog downlink signals, wherein the remote antenna unit is configured to provide downlink radio frequency signals to a plurality of antennas coupled to the remote antenna unit.

10. The multiple input and multiple output telecommunications system of claim 9, wherein the remote antenna unit comprises:
a first shared digital-to-analog converter configured to convert the digital downlink signals to analog downlink signals; and
a plurality of second mixers coupled to second oscillators and configured to produce a plurality of downlink radio frequency signals from the analog downlink signals, wherein each second mixer of the plurality of second mixers is coupled to the first shared digital-to-analog converter, wherein an output of each second mixer of the plurality of second mixers is communicatively coupled to a respective antenna of the plurality of antennas.

11. The multiple input and multiple output telecommunications system of claim 1,
wherein head-end unit further comprises:
a downlink signal path;
a second mixer located in the downlink signal path, the second mixer being coupled to a second oscillator and configured to produce a plurality of downlink signals occupying non-overlapping frequency bands and representative of wireless signals; and
a second shared analog-to-digital converter configured to convert the summed downlink signals to digital downlink signals;
wherein the remote antenna unit further comprises one or more downlink signal paths and one or more digital-to-analog converters configured to convert the digital downlink signals to analog downlink signals, wherein the remote antenna unit is configured to provide downlink radio frequency signals to a plurality of antennas coupled to the remote antenna unit.

12. A method performed in a multiple input and multiple output telecommunications system, the method comprising:
frequency shifting, using first mixers coupled to first oscillators, signals received in a plurality of uplink signal paths in a remote antenna unit to produce a plurality of uplink signals occupying non-overlapping frequency bands and representative of wireless signals;
summing the plurality of uplink signals to form summed uplink signals using a summer in the remote antenna unit;
converting the summed uplink signals to digital uplink signals using a first wideband analog-to-digital converter in the remote antenna unit; and
providing uplink signals based on the digital uplink signals from a head-end unit to one or more signal ports of a base station coupled to the head-end unit.

13. The method of claim 12, wherein the wideband analog-to-digital converter is shared among the plurality of uplink signal paths, the method further comprising converting the plurality of uplink signals to a plurality of digital uplink signals.

14. The method of claim 12, wherein the oscillators include variable frequencies for producing the plurality of uplink signals as orthogonal to each other.

15. The method of claim 12, further comprising limiting bandwidth of the digital uplink signals using digital intermediate frequency filters coupled to the first wideband analog-to-digital converter.

16. The method of claim 12, further comprising steering an antenna pattern of the remote antenna unit using variable digital filters coupled to the first wideband analog-to-digital converter.

17. The method of claim 12, further comprising:
converting the digital uplink signals to analog uplink signals using one or more digital-to-analog converters of the head-end unit; and
frequency shifting the analog uplink signals to produce uplink radio frequency signals, wherein providing uplink signals based on the digital uplink signals from the head-end unit to the one or more signal ports of a base station coupled to the head-end unit comprises providing the uplink radio frequency signals from the head-end unit to the one or more signal ports of the base station coupled to the head-end unit.

18. The method of claim 17, wherein the one or more digital-to-analog converters comprise a first wideband digital-to-analog converter;
- wherein frequency shifting the analog uplink signals to produce the uplink radio frequency signals is performed using second mixers coupled to second oscillators, wherein each second mixer of the plurality of second mixers is coupled to the first wideband digital-to-analog converter;
- wherein providing uplink radio frequency signals from the head-end unit to the one or more signal ports of the base station coupled to the head-end unit comprises providing respective uplink frequency signals from each second mixer of the plurality of second mixers to a respective signal port of the base station.

19. The method of claim 17, wherein the one or more digital-to-analog converters comprise a first wideband digital-to-analog converter;
- wherein providing uplink radio frequency signals from the head-end unit to one or more signal ports of the base station coupled to the head-end unit comprises providing the uplink radio frequency signals to a single signal port of the base station.

20. The method of claim 12, further comprising:
- frequency shifting, using second mixers coupled to second oscillators, signals received in a plurality of downlink signal paths in the head-end unit to produce a plurality of downlink signals occupying non-overlapping frequency bands and representative of wireless signals;
- summing the plurality of downlink signals to form summed downlink signals using a second summer in the head-end unit;
- converting the summed downlink signals to digital downlink signals using a second wideband analog-to-digital converter in the head-end unit;
- converting the digital downlink signals to analog downlink signals using one or more digital-to-analog converters in the remote antenna unit;
- frequency shifting, using third mixers coupled to third oscillators, the analog downlink signals to produce downlink radio frequency signals; and
- providing the downlink radio frequency signals to a plurality of antennas coupled to the remote antenna unit.

21. The method of claim 20, wherein the one or more digital-to-analog converters comprise a first wideband digital-to-analog converter.

22. The method of claim 12, further comprising:
- frequency shifting, using a second mixer coupled to second oscillator, signals received in a downlink signal path in the head-end unit from a single signal port of the base station to produce a plurality of downlink signals occupying non-overlapping frequency bands and representative of wireless signals;
- converting the plurality of downlink signals to digital downlink signals using a second wideband analog-to-digital converter in the head-end unit;
- converting the digital downlink signals to analog downlink signals using one or more digital-to-analog converters in the remote antenna unit;
- frequency shifting, using third mixers coupled to third oscillators, the analog downlink signals to produce downlink radio frequency signals; and
- providing the downlink radio frequency signals to a plurality of antennas coupled to the remote antenna unit.

* * * * *